(12) United States Patent
Krass et al.

(10) Patent No.: US 10,658,771 B2
(45) Date of Patent: *May 19, 2020

(54) ANGLED BOLT T-BAR BATTERY TERMINAL CLAMP

(71) Applicant: Royal Die & Stamping, LLC, Carol Stream, IL (US)

(72) Inventors: Steve Krass, St. Charles, IL (US); Wayne Rohr, Bloomingdale, IL (US); Nathaniel Hollin, Carol Stream, IL (US)

(73) Assignee: Royal Die & Stamping, LLC, Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/019,309

(22) Filed: Jun. 26, 2018

(65) Prior Publication Data

US 2019/0131726 A1 May 2, 2019

Related U.S. Application Data

(63) Continuation of application No. 15/645,138, filed on Jul. 10, 2017, now Pat. No. 10,008,789.

(51) Int. Cl.
*H01R 11/28* (2006.01)
*H01R 4/30* (2006.01)
*H01R 11/26* (2006.01)
*H01M 2/30* (2006.01)

(52) U.S. Cl.
CPC ............ *H01R 11/283* (2013.01); *H01M 2/30* (2013.01); *H01R 4/305* (2013.01); *H01R 4/307* (2013.01); *H01R 11/26* (2013.01); *H01R 11/289* (2013.01); *H01R 11/282* (2013.01)

(58) Field of Classification Search
CPC ...... H01R 11/283; H01R 4/305; H01R 4/307; H01R 11/26; H01R 11/289; H01R 11/282; H01R 11/281; H01R 11/287; H01M 2/30
USPC .................................. 439/758, 761, 762, 772
See application file for complete search history.

(56) References Cited

U.S. PATENT DOCUMENTS

| | | | | |
|---|---|---|---|---|
| 6,817,908 | B2* | 11/2004 | Freitag | H01R 11/285 439/763 |
| 9,022,815 | B2* | 5/2015 | Kim | H01R 11/283 439/762 |
| 9,608,254 | B1* | 3/2017 | Freitag | H01M 2/206 |
| 9,660,363 | B2* | 5/2017 | Schmidt | H01R 11/283 |
| 10,008,789 | B1* | 6/2018 | Krass | H01R 11/283 |
| 2011/0195615 | A1* | 8/2011 | Falchetti | H01R 11/283 439/806 |

\* cited by examiner

*Primary Examiner* — Travis S Chambers
(74) *Attorney, Agent, or Firm* — Barnes & Thornburg LLP

(57) ABSTRACT

A battery terminal clamp has a body portion with an intermediate aperture for engaging a battery post. The clamp further includes a threaded rod extending upwardly relative to the body portion at an angle to the horizontal of between 45° and 60°. A battery pull bar extends from one side wall to the opposite side wall of the body portion. A wedge-shaped element abuts one side wall of the body portion. Together with the battery pull bar, the wedge-shaped element alternately effects a reduction in, or increase in, the size of the intermediate aperture.

20 Claims, 6 Drawing Sheets

ANGLED BOLT T-BAR BATTERY TERMINAL CLAMP

CROSS REFERENCE TO RELATED APPLICATIONS

The present application is a continuation of U.S. patent application Ser. No. 15/645,138, filed Jul. 10, 2017, entitled "ANGLED BOLT T-BAR BATTERY TERMINAL CLAMP", now U.S. Pat. No. 10,008,789, which is owned by the assignee of the present application, and the disclosure thereof is hereby incorporated by reference herein.

TECHNICAL FIELD

This invention is directed to a battery terminal clamp, and more particularly to a battery terminal clamp that enables a user to tighten that clamp onto the post of a storage battery from a top, angled orientation.

BACKGROUND OF THE INVENTION

Storage batteries of the type used in automobiles, trucks and the like, generally have a battery post made of a lead alloy material. The battery post usually has a cylindrical or frusto-conical shape. The battery is connected to the vehicle electrical system by a battery cable assembly. The cable assembly has connectors which clamp to the battery posts, providing a secure electrical and mechanical connection.

Several different kinds of connectors are known in the art. One such connector is a molded, generally U-shaped device with a bolt passing through outwardly projecting yoke-like arms. Another more commonly used connector is a stamped battery terminal clamp, fabricated from sheet metal.

U.S. Pat. No. 5,733,152 ("the '152 patent") is directed to a battery terminal clamp. The '152 patent is owned by the assignee of the present application, and relates to a battery terminal clamp which permits improved mechanical and electrical connection to a battery terminal post. The connector of the '152 patent has enhanced resistance to rotation when connected to a battery terminal post. That connector is also economical to manufacture, and is adaptable for automated assembly and production. An additional advantage of this connector is that it is adaptable to different automobile models and batteries U.S. Pat. No. 6,817,908 ("the '908 patent") is also directed to a battery terminal clamp, and is owned by the assignee of the present application. The '908 patent includes an intermediate aperture, a vertically disposed threaded rod, a threaded nut secured to the threaded rod, and a pair of wedge-shaped elements. Downward movement of the threaded nut along the threaded rod causes a responsive movement of the pair of wedge-shaped elements. The movement of these wedge-shaped elements in turn reduces the size of the intermediate aperture, and tightens the battery terminal clamp onto the post of the storage battery.

U.S. Pat. No. 5,879,202 ("the '202 patent") is also directed to a battery terminal clamp. This connector is of the type that permits it to be tightened on the battery post using a threaded nut that is positioned above, rather than on the side of, the connector. As a result, especially in tight, confined areas found under the hoods of modern automobiles, one installing the clamp of the '202 patent can more easily access the nut during that installation.

Additional relevant prior art references include U.S. Pat. Nos. 6,250,973; 5,941,738; 5,800,219; 5,738,552; 5,711,688; 5,672,442; 5,599,210; 5,316,505; 4,354,726; 4,063,794; 4,054,355; and 3,568,138. None of these patents, however, alone or in combination, disclose the present invention.

SUMMARY OF THE INVENTION

The invention is a battery terminal clamp having a body portion. This body portion has a top, a bottom, and a pair of opposite side walls. The connector also includes an intermediate aperture for engaging a battery post. The size of the intermediate aperture is variable from a size well in excess of the diameter of the battery post to which it is to be connected, to a size somewhat smaller than the diameter of the battery post to which it is to be connected. In this way, the connector can accommodate its placement onto, and its removal from, the battery post.

The connector further includes a generally horizontal, T-shaped battery pull bar. This pull bar is positioned along a line extending generally from one side wall of the connector to the other side wall of the connector. The pull bar has an end flange at one of its ends.

A rod, preferably a threaded rod, extends upwardly at an angle of between 30° and 65° from the horizontal, and its movement facilitates the opening and closing of the intermediate aperture of the connector.

The connector further includes a wedge-shaped element. This element is positioned generally adjacent to the threaded rod, and is guidably moved along this threaded rod.

A threaded nut is rotatably secured to the threaded rod. The threaded nut is positioned above the wedge-shaped element, and directly or indirectly abuts against the wedge-shaped element. As the threaded nut is moved along the threaded rod and in a generally downward direction, the nut pushes upon that wedge-shaped element. In turn, the wedge-shaped element forces the horizontal pull bar laterally and to the right, i.e., in a direction away from the side wall of the connector, so as to cause a closure or reduction in size of the intermediate aperture.

In a further embodiment, the battery terminal clamp is made of copper or a copper alloy.

In yet another embodiment, the battery terminal clamp is made of one piece.

DETAILED DESCRIPTION

There are many possible embodiments of this invention. The drawings and description below describe in detail two preferred embodiments of the invention. The present disclosure is to be considered as an example of the principles of the invention. The disclosure is not intended to limit the broad aspect of the invention to the illustrated embodiments.

Figure 1:
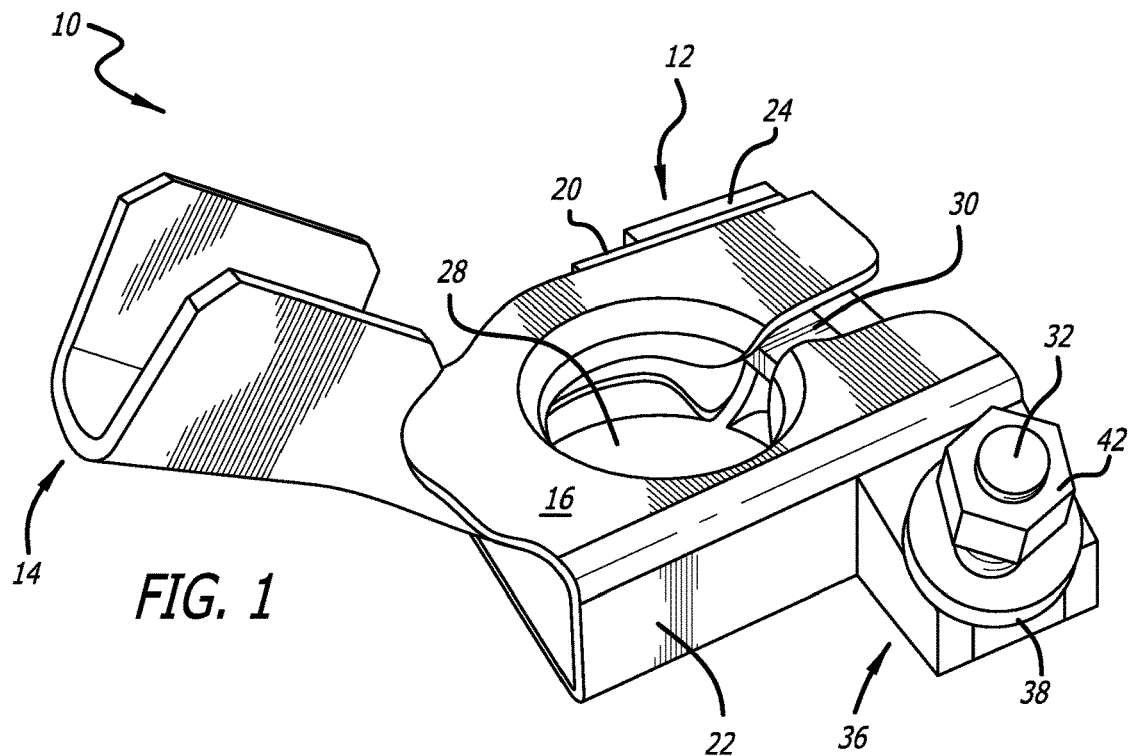
FIG. 1 is a perspective view of a first embodiment of the battery terminal clamp of the present invention, and with the threaded nut in a relatively high position upon its threaded rod and spaced apart from a washer.

Referring to the drawings, FIG. 1 shows a perspective view of one embodiment of a battery terminal clamp 10 in accordance with the invention. The clamp 10 comprises essentially two main portions, including a body portion 12 and a ferrule portion 14.

The battery terminal clamp 10 is preferably made of copper or a copper alloy. The clamp 10, including the body portion 12 and the ferrule portion 14, is formed from a metal blank, such as a single, flat piece of copper. Manufacturing the clamp 10 by a stamping process as a single blank is convenient and cost-efficient.

When the clamp 10 of FIG. 1 has been fully fabricated and is ready for use, the body portion 12 is fitted over a frusto-conical shaped terminal post (not shown) of a storage battery for a motor vehicle.

The ferrule portion 14 is adapted for electrically connecting and securing a battery cable (not shown). As a result of this connection, electrical current can pass from the terminal post of the vehicle's storage battery, and then through the body portion 12, the ferrule 14, and the cable, and then on to various power consuming components of the motor vehicle.

The insulation-free end of the battery cable is placed onto the malleable ferrule 14. Then, the sides of the ferrule 14 are pushed towards each other so as to firmly grip, and in this way mechanically and electrically secure, the uninsulated portion of that cable to the ferrule 14.

Figure 2:
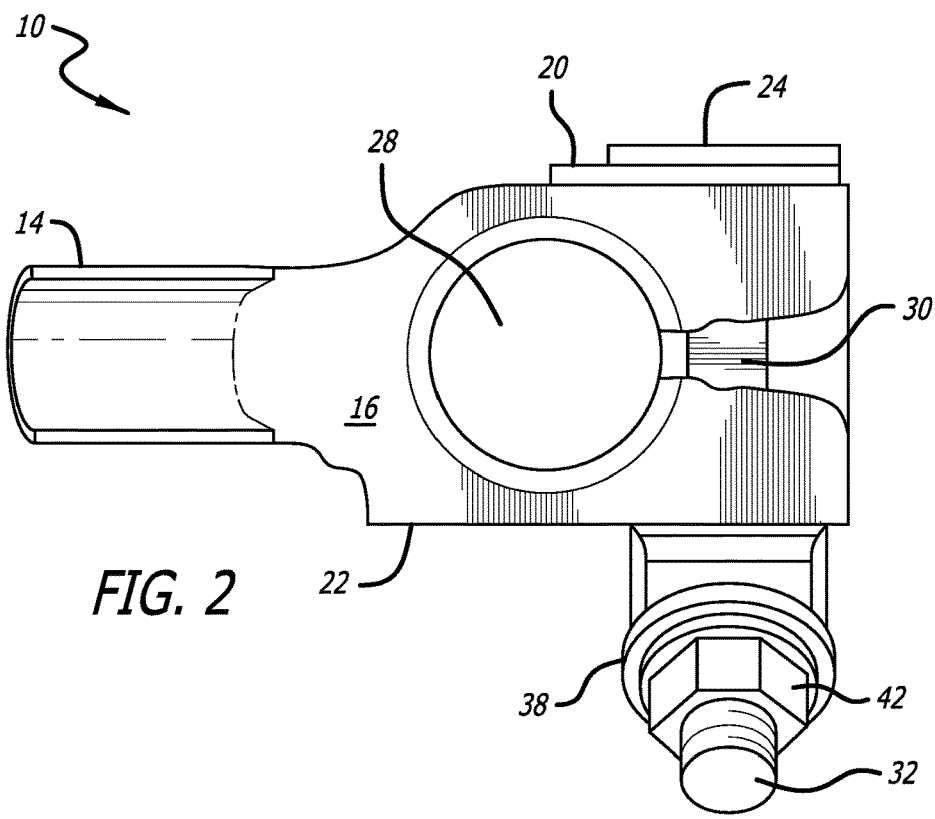
FIG. 2 is a top view of the clamp of FIG. 1, but with the threaded nut in a relatively lower position upon its threaded rod, and in contact with the washer.

As shown in various Figures, the body portion 12 includes a number of surfaces. FIGS. 1 and 2 show a top surface 16, FIG. 3 shows a bottom surface 18, and FIGS. 1, 2, 3, 4, 5, and 6 show a pair of opposite side walls 20 and 22.

Figure 3:
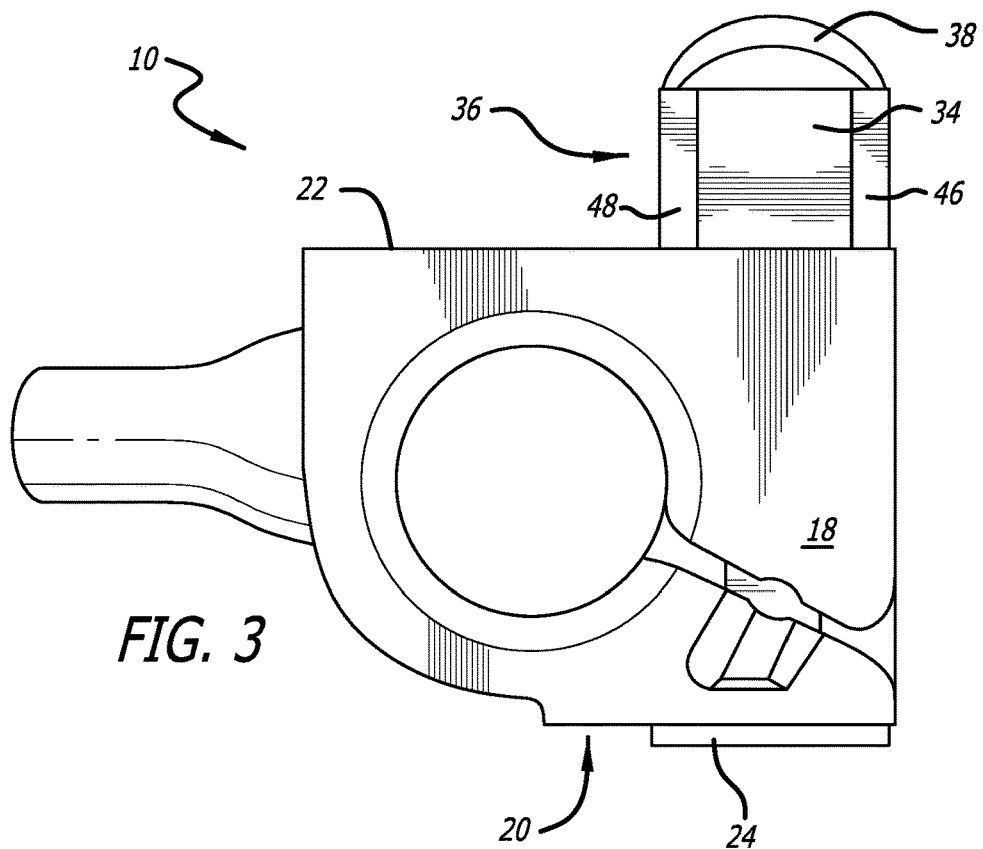
FIG. 3 is a bottom view of the clamp of FIG. 1.

As may be seen in various Figures, including FIGS. 2 and 3, the clamp 10 also includes an intermediate aperture 28 for engaging the generally frusto-conical shaped battery post (not shown). The size of the intermediate aperture 28 can be increased or decreased, to facilitate removal of the clamp 10 from the battery post, or to secure the clamp 10 on the battery post, respectively.

FIGS. 1 and 2 show the aperture 28 in its expanded or enlarged condition. In this condition, the aperture 28 is of a size well in excess of the diameter of the battery post to which it is to be connected. The enlarged aperture 28 of FIGS. 1 and 2 enables the battery terminal clamp 10 to be easily placed over the battery post.

After the battery terminal clamp 10 has been placed over the battery post, it is tightened in a manner to be described later. When the clamp 10 is tightened, the aperture 28 decreases in size, to the size depicted in FIGS. 6 and 7. This decreased aperture 28 diameter is very close to the diameter of the battery post to which the clamp 10 is to be connected. As a result, the clamp 10 tightly grips the battery post. Because of the structure described above, the clamp 10 can be easily secured to, or alternately removed from, the frusto-conical shaped battery post.

Figure 9:
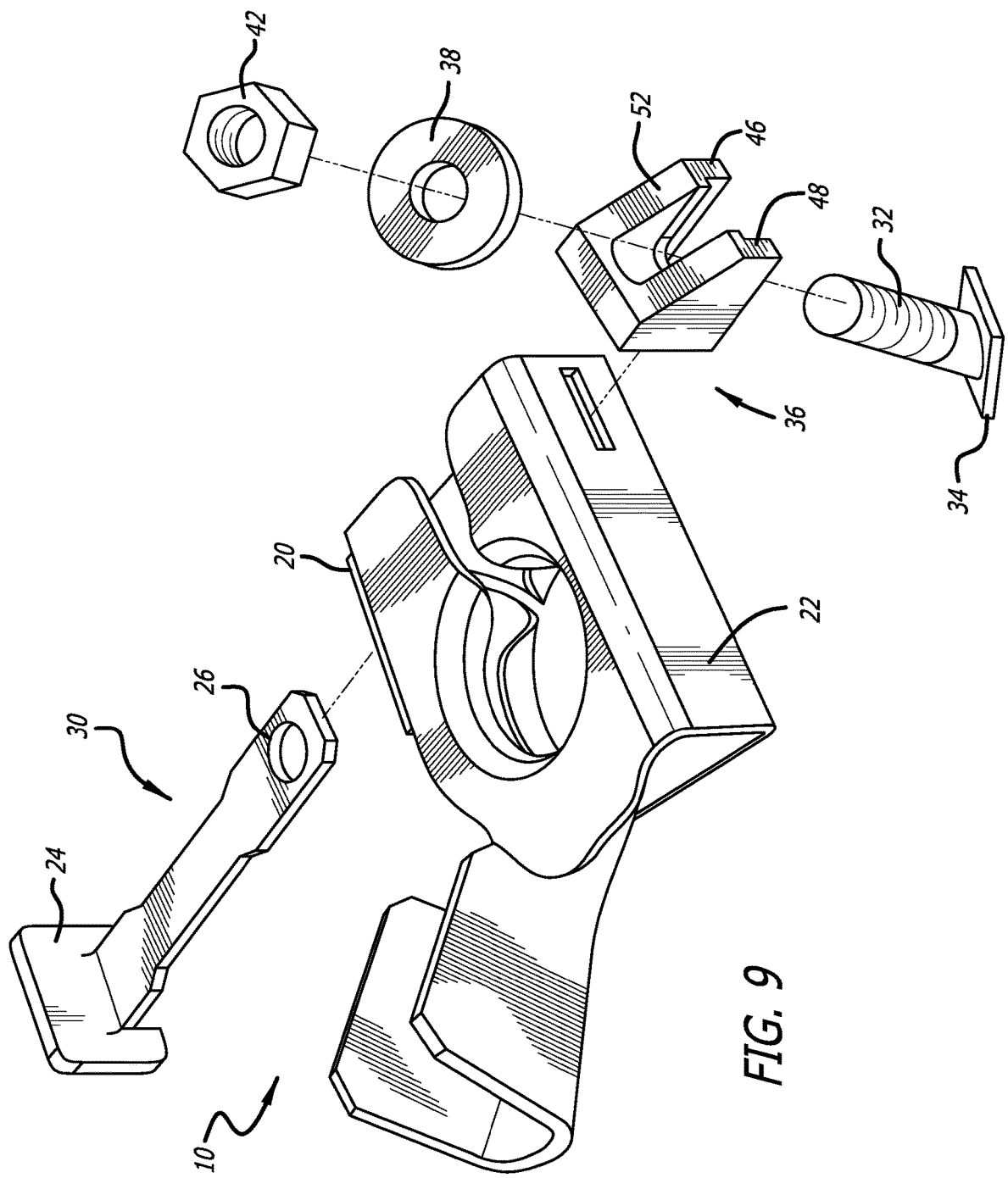
FIG. 9 is an exploded view of the battery terminal clamp of FIG. 1.

As shown most clearly in FIG. 9, a battery pull bar 30 is also provided. This battery pull bar 30 can preferably be made of a flat piece of metal, such as steel. When assembled within the confines of the clamp 10 of the invention, this battery pull bar 30 is positioned along a line extending generally from one side wall 20 of the clamp 10 to the other side wall 22 of the clamp 10. As may best be seen in FIGS. 2, 3, and 9, the length of the battery pull bar 30 exceeds the distance between the two side walls 20 and 22. As may also be seen in FIG. 9, battery pull bar 30 includes a flange 24 at a first lateral end of the pull bar 30, and an orifice 26 at a second lateral end of the pull bar 30.

Figure 4:
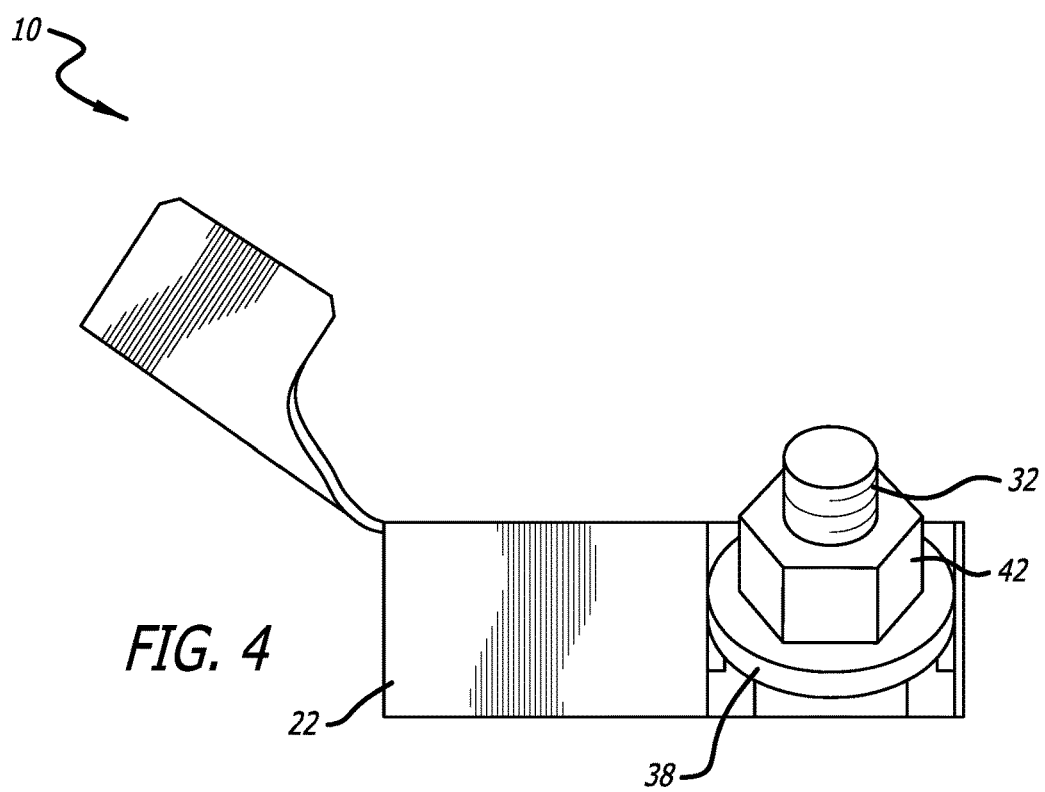
FIG. 4 is a right side view of the clamp of FIG. 1.
Figure 5:
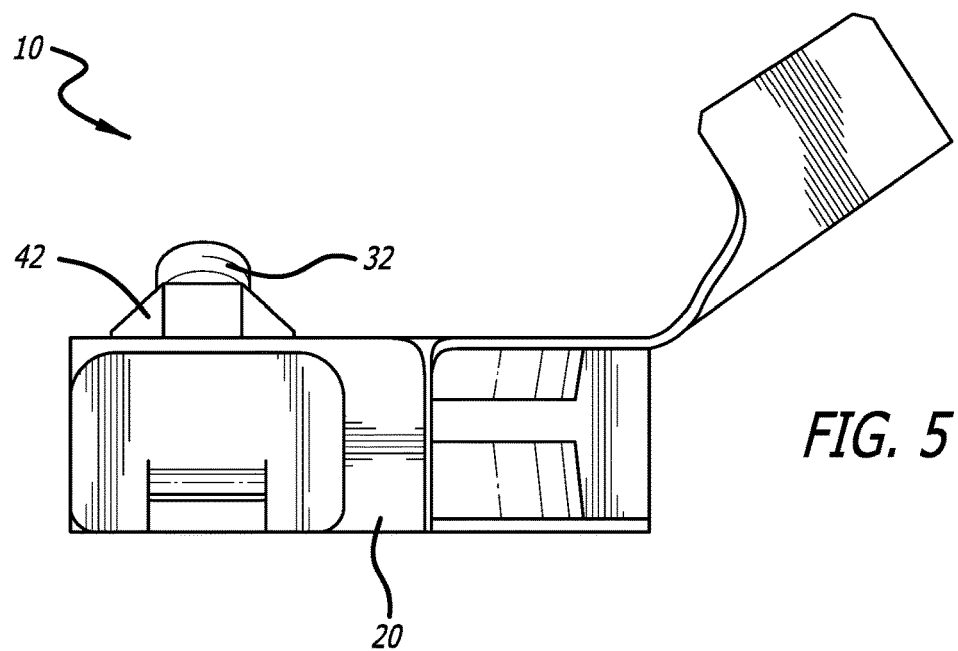
FIG. 5 is a left side view of the clamp of FIG. 1.
Figure 6:
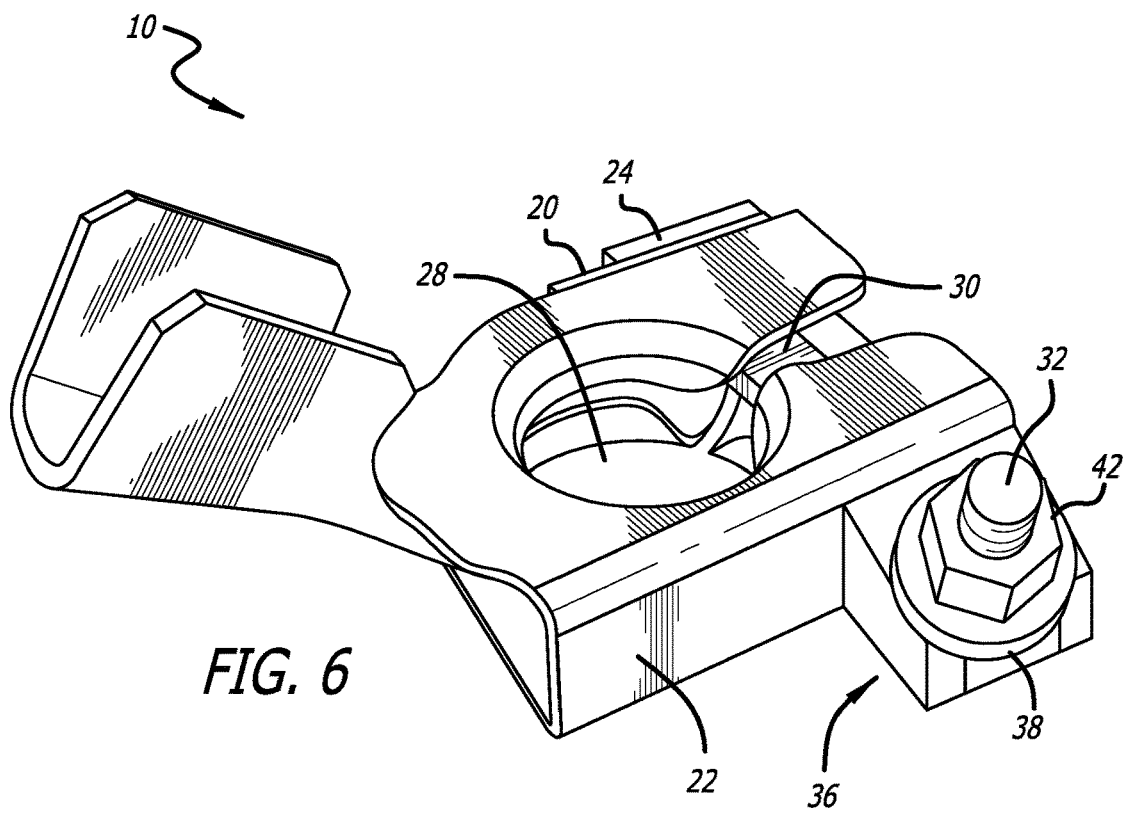
FIG. 6 is a perspective view of the battery terminal clamp of FIG. 2, with the threaded nut in a somewhat lower position upon its threaded rod.
Figure 7:
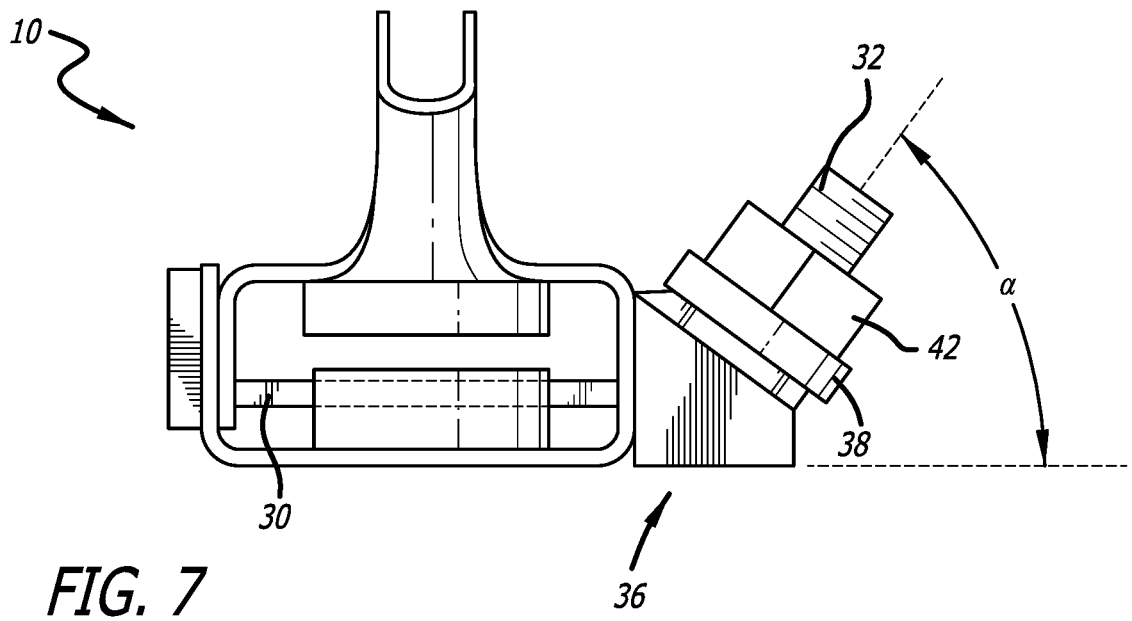
FIG. 7 is an end view of the clamp of FIG. 6.

As may best be seen in FIGS. 4, 5, and 7, a rod 32, most preferably a threaded rod, extends upwardly from the base of the clamp 10. As may best be seen in FIG. 7, this threaded rod 32 may be disposed at an angle α of between 30° and 65° from the horizontal. In this preferred embodiment, the threaded rod 32 of FIG. 7 is disposed at angle α of 55° from the horizontal.

As may also best be seen in the exploded view of FIG. 9, the threaded rod 32 includes an integral base or pad 34. Because the base or pad 34 is horizontally oriented relative to the clamp 10, the threaded rod 32 also extends upwardly from the base pad 34 at about a 55° angle. This base or pad 34 helps to secure the threaded rod 32 to a position in the general vicinity of the side wall 22.

The clamp 10 also includes a wedge-shaped element 36. The position of the wedge-shaped element 36 relative to the clamp 10 may best be seen in FIGS. 1, 4, 6, and 7. The wedge-shaped element 36 is shown separated from the rest of the battery terminal clamp 10 in the exploded view of FIG. 9.

Figure 8:
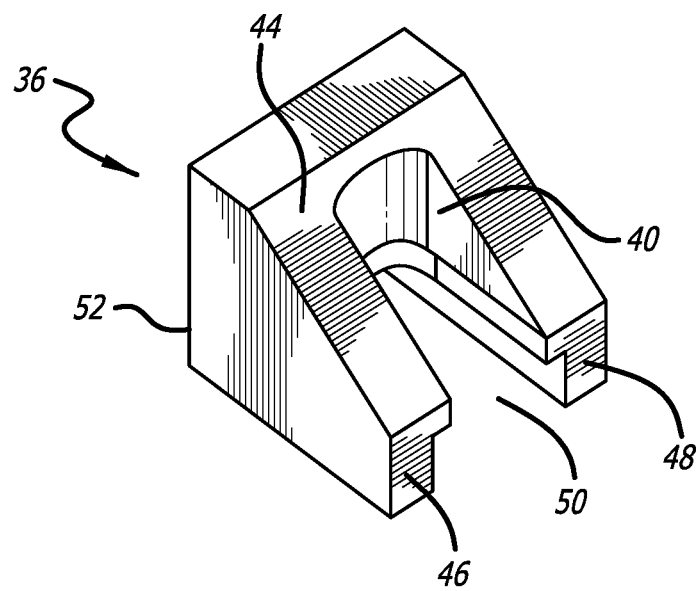
FIG. 8 is a front, perspective view of the wedge-shaped element of the clamp of FIG. 1.

As may be seen in FIG. 8, wedge-shaped element 36 has a generally elongated or oblong opening 40. This elongated or oblong opening 40 is also completely contained by the various walls of the wedge-shaped element 36. As a result of this oblong construction of opening 40, wedge-shaped element 36 can move both (a) vertically, up and down along the rod 32; and (b) horizontally, towards and away from the side wall 22 of battery terminal clamp 10.

This wedge-shaped element 36 is also preferably made of a rigid metal such as die-cast steel. As noted above, and as may be seen by comparing the positions of the wedge-shaped element 36 in FIGS. 1 and 7, respectively, this wedge-shaped element 36 is positioned generally along the threaded rod 32, for movement along this threaded rod 32.

The clamp 10 of the invention also includes a conventional threaded nut 42. This threaded nut 42 rotates upon the threaded rod 32. Clockwise rotation of the threaded nut 42 moves the nut downwardly along the threaded rod 32, while counterclockwise rotation of the threaded nut 42 moves the nut upwardly along the threaded rod 32.

As the threaded nut 42 is turned clockwise and moves downwardly upon the threaded rod 32, the nut 42 either directly or indirectly abuts, and forces down, the wedge-shaped element 36. This, in turn, causes the wedge-shaped element 36 to push on the side wall 22 and thereby start the closure of the intermediate aperture 28. Indirect contact between the nut 42 and the wedge-shaped element 36 occurs if, as is preferred, there is a washer 38 between the nut 42 and that wedge-shaped element 36. Direct contact between the nut 42 and the wedge-shaped element 36 occurs if there is no washer 38 between the nut 42 and that element 36.

FIG. 9 shows the embodiment of the invention of FIG. 1, but in an exploded view. When the threaded nut 42 is removed from the threaded rod 32, certain components of the battery terminal clamp 10 of the invention can be disassembled. As previously discussed and as may be seen in this FIG. 9, the threaded rod 32 includes an integrally formed base or pad 34.

FIGS. 8 and 9 also show the wedge-shaped element 36 in more detail. The ramp 44 of this wedge-shaped element 36 is disposed at an angle of approximately 35° to the horizontal. The wedge-shaped element 36 has a height of approximately 14.5 mm, a width of approximately 14.0 mm, and a length of approximately 19.77 mm. As may be seen in FIG. 8, the gap 50 between its arms 46 and 48 is approximately 9.70 mm.

When assembled in the manner depicted in FIG. 1, the pad 34 that forms the base of threaded road 32 is positioned between the arms 46 and 48 of wedge-shaped element 36, i.e., in the gap 50 of the wedge-shaped element 36. The portion of the pad 34 that fits between the arms 46 and 48 has a width of approximately 9.56 mm. Because the gap 50 is slightly larger at 9.70 mm, the pad 34 and its integral threaded rod 32 can move forward and back within this gap 50. That forward and back movement is caused as a result of the upward and downward movement of the threaded nut 42 on the threaded rod 32.

In order to tighten the battery terminal clamp 10, as when installing the clamp 10 onto a battery post, the threaded nut 42 is turned clockwise. When this is done, the flat side 52 (FIG. 8) of the wedge-shaped element 36 that faces the side surface wall 22 pressures that wall 22. In addition, the battery pull bar 30 moves to the right, using the direction depicted in FIG. 7. As a result, the intermediate aperture 28 is reduced in size, and the clamp 10 tightens on the battery post.

In order to loosen the battery terminal clamp 10, as when removing the clamp 10 from a battery post, the threaded nut 42 is turned counterclockwise. When this is done, the flat side 52 of the wedge-shaped element 36 that faces the side surface wall 22 releases pressure on that wall 22. In addition, the battery pull bar 30 moves to the left, using the direction depicted in FIG. 7. As a result, the intermediate aperture 28 is increased in size, and the clamp 10 loosens its grip on the battery post. The clamp 10 may then be removed from the battery post.

Figure 10:
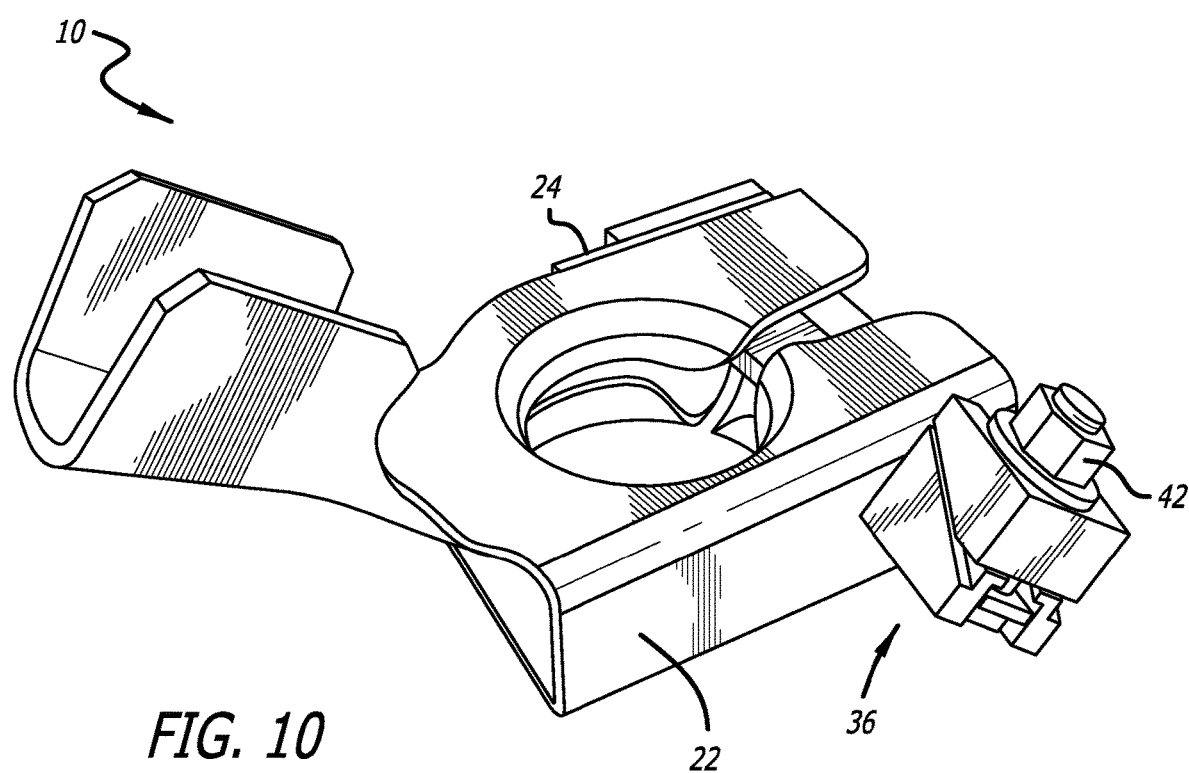
FIG. 10 is a perspective view of a second embodiment of the invention.

FIG. 10 shows a second embodiment of the invention. In the first embodiment of FIGS. 1-9, the threaded rod 32 is disposed perpendicular to the lengthwise axis of the connector 10. In this second embodiment of FIG. 10, the threaded rod is disposed parallel to the lengthwise axis of the connector. In both cases, the angle α of the threaded rod to the horizontal can range from between 30 and 65°.

A battery terminal clamp has been described which achieves good mechanical and electrical connection to the terminal post of a battery. The connector of the present invention affords easy and convenient connection and disconnection from the battery post through rotation of a standard, top-mounted fastener.

It is understood that, given the above description of the embodiments of the invention, various modifications may be made by one skilled in the art. Such modifications are intended to be limited only by the scope of the below claims.

The invention claimed is:

1. A battery terminal clamp comprising:
a body portion including a top, a bottom, and a first side wall and an opposite second side walls, and the body portion further having an intermediate aperture for engaging a battery post, the size of said intermediate aperture being variable to accommodate the placement of the body portion onto, and the removal of the body portion from, the battery post;
a battery pull bar extending from the first side wall to the second side wall, said battery pull bar having an opening there through;
a wedge-shaped element positioned adjacent to the first side wall of the body portion;
a threaded rod configured to extend through both the opening in the battery pull bar and the wedge-shaped element; and,
wherein the threaded rod is positioned at an acute angle relative to a bottom edge of the wedge-shaped element.

2. The battery terminal clamp of claim 1, wherein the battery pull bar includes a flange coupled to a first end of the battery pull bar, said flange positioned adjacent to the second side wall of the body portion.

3. The battery terminal clamp of claim 1, wherein the first and second side walls each have an opening formed therethrough, and wherein said battery pull bar is configured to be inserted into said openings.

4. The battery terminal clamp of claim 1, wherein the threaded rod extends upwardly relative to a bottom edge of the wedge-shaped element at an angle of approximately 55°.

5. The battery terminal clamp of claim 1, wherein the battery terminal clamp is made of one piece of metal.

6. The battery terminal clamp of claim 1, further comprising a threaded nut that is inserted onto the threaded rod, the threaded nut abutting against the wedge-shaped element, and being movable upon the threaded rod in an upward and downward direction.

7. The battery terminal clamp of claim 6, further comprising a washer disposed between the threaded nut and the wedge-shaped element.

8. The battery terminal clamp of claim 1, wherein the threaded rod includes an integral base that is configured to be positioned against a lower extent of the wedge-shaped element.

9. The battery terminal clamp of claim 8, wherein, when the nut is moved in a downward direction on the threaded rod, the size of the intermediate aperture becomes smaller.

10. The battery terminal clamp of claim 1, wherein the wedge-shaped element includes a first arm and a second arm, and wherein an integral base of the threaded rod is slidably movable with respect to the first and second arms of the wedge-shaped element.

11. The battery terminal clamp of claim 10, wherein the wedge-shaped element includes an oblong opening defined between the first arm and the second arm.

12. A battery terminal clamp comprising:
a body portion having (i) a top wall with an aperture for engaging a battery post, and (ii) a pair of opposed side walls depending from the top wall;
a wedge-shaped element abutting one of said opposed side walls of the body portion;
an elongated rod extending upwardly through the wedge-shaped element at an acute angle relative to a lowermost extent of the wedge-shaped element;
a securing element that engages with an extent of the elongated rod and abuts a portion of the wedge-shaped element; and,
wherein said engagement between the elongated rod and the securing element varies the size of the aperture in order to accommodate the placement of the connector onto, and the removal of the connector from, the battery post.

13. The battery terminal clamp of claim 12, wherein, when the securing element is moved in a downward direction on the elongated rod, the size of said aperture is reduced.

14. The battery terminal clamp of claim 12, wherein the wedge-shaped element includes a first arm and a second arm that collectively define an opening that receives an extent of the elongated rod.

15. The battery terminal clamp of claim 12, wherein the battery terminal clamp is made of one piece of metal.

16. The battery terminal clamp of claim 12, further comprising a pull bar that extends between said opposed side walls of the body portion.

17. The battery terminal clamp of claim 16, wherein each of said opposed side walls has an opening formed there through, and wherein said pull bar extends through the openings formed in said opposed side walls.

18. The battery terminal clamp of claim 17, wherein the elongated rod extends through the wedge-shaped element and an opening formed in the pull bar, and wherein engagement between the elongated rod and the pull bar further varies the size of the aperture.

19. The battery terminal clamp of claim 12, wherein the elongated rod extends upwardly relative to a lowermost extent of the wedge-shaped element.

20. The battery terminal clamp of claim 19, wherein the elongated rod and the lowermost extent of the wedge-shaped element form an angle of approximately 55°.

* * * * *